United States Patent [19]

Bart et al.

[11] Patent Number: 4,621,289

[45] Date of Patent: Nov. 4, 1986

[54] DIGITAL SYNC SEPARATOR AND DIFFERENTIATOR

[75] Inventors: Stan Bart, Hoffman Estates; Gopal K. Srivastava, Buffalo Grove, both of Ill.

[73] Assignee: Zenith Electronics Corporation, Glenview, Ill.

[21] Appl. No.: 591,741

[22] Filed: Mar. 21, 1984

[51] Int. Cl.[4] .............................................. H04N 5/08
[52] U.S. Cl. .................................... 358/153; 358/155
[58] Field of Search ............... 358/148, 153, 154, 155, 358/156, 157, 158

[56] References Cited

U.S. PATENT DOCUMENTS

| | | | |
|---|---|---|---|
| 3,639,780 | 2/1972 | Lovelace | 358/153 |
| 3,869,568 | 3/1975 | Ueda et al. | 358/153 |
| 4,185,299 | 1/1980 | Harford | 358/153 |

Primary Examiner—James J. Groody
Assistant Examiner—Michael D. Parker

[57] ABSTRACT

Composite sync is separated from video despite noisy, weak, or nonstandard signal conditions. Sync is separated from the composite video signal by comparing the video signal to a D.C. reference voltage which is generated depending upon the particular characteristics of the received video signal. Outputted sync signals during vertical sync and nonstandard periods are conditioned for proper phasing in other receiver circuits such as the Horizontal A.P.C.

32 Claims, 6 Drawing Figures

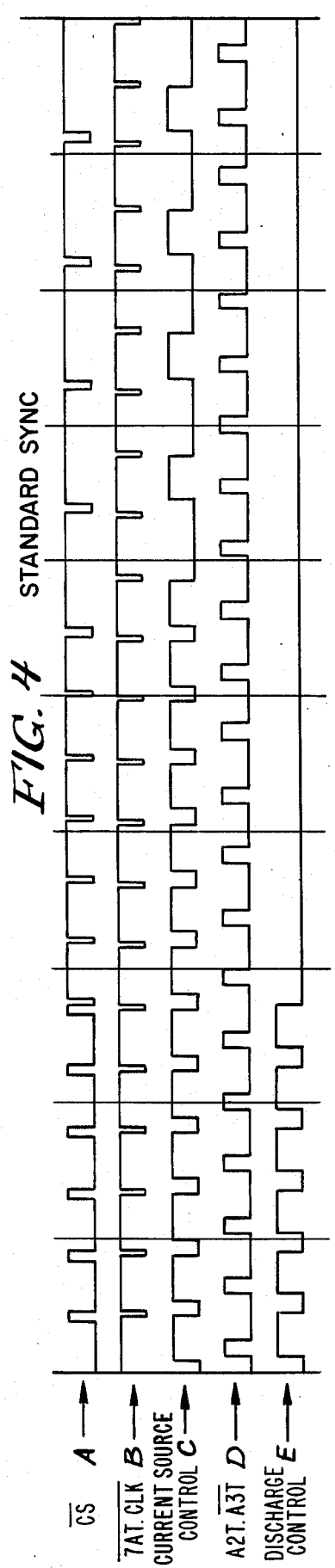
FIG. 4 STANDARD SYNC
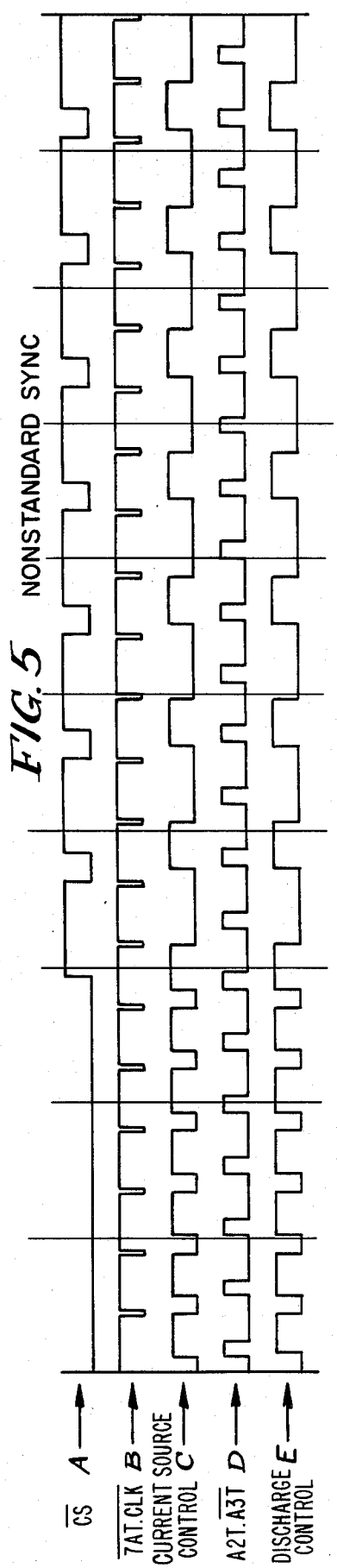
FIG. 5 NONSTANDARD SYNC
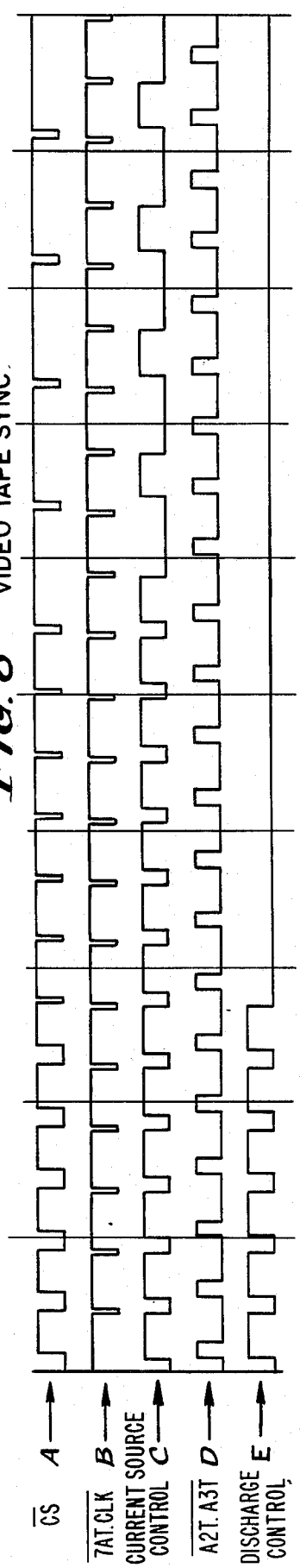
FIG. 6 VIDEO TAPE SYNC

DIGITAL SYNC SEPARATOR AND DIFFERENTIATOR

BACKGROUND OF THE INVENTION

The present invention generally concerns the television art and the processing of synchronizing signals within the television receiver. More particularly, the present invention concerns the separation of such signals from the transmitted video signal under varying signal conditions.

The video picture image transmitted by a television video signal is reproduced on a television screen through the use of synchronizing signals which are transmitted on the same carrier signal and serve to regulate the horizontal and vertical sweeping action of the picture tube. This action allows the video image to be traced in a raster-like fashion on the viewing screen. The frequency and timing standards for these signals are set by the N.T.S.C. to achieve industry-wide uniformity and compatibility between tranmsitting stations and the different brands of home television sets.

In practice, a composite sync signal bearing horizontal and vertical sync information is superimposed on a video carrier signal. In a standard signal this results in regularly spaced sync pulses having video information imposed between the synchronizing pulses. There is no video information during the pulses themselves; horizontal and vertical sync pulses occur during horizontal and vertical blanking periods, respectively, in which the picture tube scanning beam is returned to the left side and upper left corner, respectively. Also, the sync pulses typically have a higher D.C. component than the video information. Thus, for a television receiver to be effective, it needs to separate the sync information from the video information which can be done in a number of ways relying on the known sync signal characteristics.

This operation has long been performed in the television art and frequently has been accomplished using a conventional sync filter as shown in FIG. 1. This is a pure analog filter which requires a capacitor 10, two resistors 12 and 14, a diode 16, and an electrolytic capacitor 18. Although effective, this is not the most ideal method for separating the sync information from the remainder of the video signal. Particularly, problems can arise in television reception when this traditional configuration is used if a weak or noisy signal is received; the sync tips of the synchronizing pulses may move toward the porch and video levels of the carrier signal thus making them harder to distinguish.

Also, problems can arise when a television receiver is used in conjunction with a home video game, video cassette recorder, or computer, frequently described in the art as non-standard operation. The outputs of video games and computers have synchronizing signals which frequently differ significantly from those specified in N.T.S.C. promulgated standards. Often these pulses are longer or shorter in duration than standard horizontal synchronizing pulses thus creating difficulties for other circuits in the television receiver, particularly the Horizontal A.P.C. circuit. Likewise, the vertical sync pulses present during the serrated vertical period of the video signal may be much longer or shorter in duration than horizontal sync pulses or standard vertical sync pulses and may also cause difficulties in other circuits.

Thus, it is desired that a sync separator or filter be able to accurately separate or pick out the composite sync signal from among the rest of the video signal even during noisy and weak signal conditions when the sync information is less clearly defined in contrast to the remainder of the video signal. Also, it is desired that a sync separator not fail to recognize sync information when it is received in nonstandard form. Additionally, it is desired that at the sync separation stage, some provision be made to protect ensuing circuits against longer enduring sync pulses and thereby ensure the accuracy of those circuits. Finally, it is desired then to overcome these problems while at the same time minimizing cost, by eliminating external parts.

Therefore, it is an object of the present invention to provide for a digital sync separator utilizing a minimum of external components.

It is a further object of the present invention to provide an improved digital sync separator for operation during noisy, weak, and nonstandard video signal conditions without sacrificing performance during standard operation.

It is still a further object of the present invention to provide a sync differentiator for imposing at least a minimum of standardization in the composite sync signal within the receiver for other circuits such as the Horizontal A.P.C.

It is a related object of the present invention to provide conditioning of the composite sync signal for further use in the television receiver.

It will be appreciated that a still further object of the present invention is to provide an improved digital sync separator and differentiator with a minimum of cost.

BRIEF DESCRIPTION OF THE FIGURES

The features of the present invention which are believed to be novel are set forth with particularity in the appended claims. The invention, together with its objects and the advantages thereof, may best be understood by reference to the following description taken in conjunction with the accompanying drawings in which like reference numerals identify like elements and in which:

FIG. 4 is a collection of waveforms representing illustrative signals at various points in the schematic of FIG. 3 in response to receipt of a standard signal;

FIG. 5 is similar to FIG. 4 except that it represents the various waveforms for one example of a nonstandard signal received by the system; and FIG. 6 is an example of the waveforms of FIGS. 4 and 5 for the receipt of a second illustrative nonstandard signal.

DESCRIPTION OF THE PREFERRED EMBODIMENT

Figure 1:
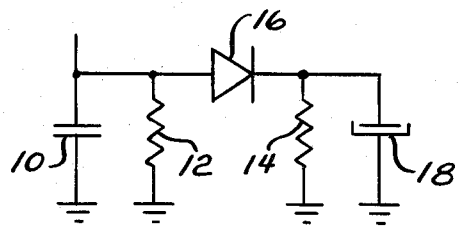
FIG. 1 is a schematic diagram of a conventional sync filter as known in the art.

The present invention concerns an improvement in a television receiver sync filter representing an attempt to overcome currently existing problems, especially in the areas of weak, noisy, and nonstandard video signals.

Generally, one aspect of the present invention separates the sync signal from the rest of the video signal by comparing the video signal to a D.C. reference-level voltage. This is effective because, as explained above, the sync information is superimposed, or rides on, a carrier voltage or signal, and typically there is approximately a three volt separation between the tips of the sync pulses and the video carrier D.C. level frequently referred to as "O" carrier. However, the video signal does not always provide a clear differentiation between the sync pulses and the remainder of the signal composed of video information. That is, the representative D.C. level for each type of information is not always distinct to the degree which it would be in an ideal signal because of noisy, weak, or nonstandard conditions. To overcome such difficulties, a related aspect of the present invention varies a D.C. reference level in the comparing circuitry according to the characteristics of the particular signal received. In this respect, the present invention provides three ways from varying the D.C. reference level, each related to the charging of a filter capacitor which provides the D.C. reference level. The first such method involves slowing the discharge of the capacitor. The second slows the charging of the capacitor after a predetermined period. The third limits the time that the capacitor may charge.

In the present invention, the video signal is effectively sliced to separate the sync information by comparing the signal to a reference level determined by the characteristics of each particular input signal. In this way the present invention provides for accurately separating the sync information from a noisy, weak, or nonstandard video signal.

Additionally, a still further aspect of the preferred embodiment of the present invention provides for conditioning the width of the sync pulses which are passed on to other circuits in the television receiver. That is, the sync pulses outputted from the present filter are truncated if they are too long for other equipment in the television receiver. This aspect of the preferred embodiment provides a more nearly uniform current-pulse width to avoid jitter in the displayed video signal and other runaway type problems associated with unequal sync pulses. Consequently, the video picture is coordinated by the true sychronizing information originally transmitted rather than being effected by the noisy or weak signal conditions which may have resulted or the lack of compatibility between nonstandard signals and the typical television receiver.

The lack of uniformity in synchronizing signals can be particularly troublesome when a television receiver is used in conjunction with a video cassette recorder or a home computer. In contrast to a standard (N.T.S.C.) signal in which the vertical sync pulses are each 26 to 28 microseconds in duration, the sync for a computer may endure for anywhere from three horizontal lines up to about eighteen horizontal lines. Similarly, different prerecorded video tapes use different sync signals (usually in an attempt to discourage or prevent illicit reproduction) which may have differing widths for vertical sync, e.g. ten microseconds for Bellguard tapes and one-half line for TDK tapes. The use of home video players further complicates the necessary synchronizing capabilities of a television receiver due to the varying modes of play such as "stop action" "slow motion," and "fast forward," among others. The pulse differentiating aspects of the present invention seek to provide compatability with these various sync constraints.

Figure 2:
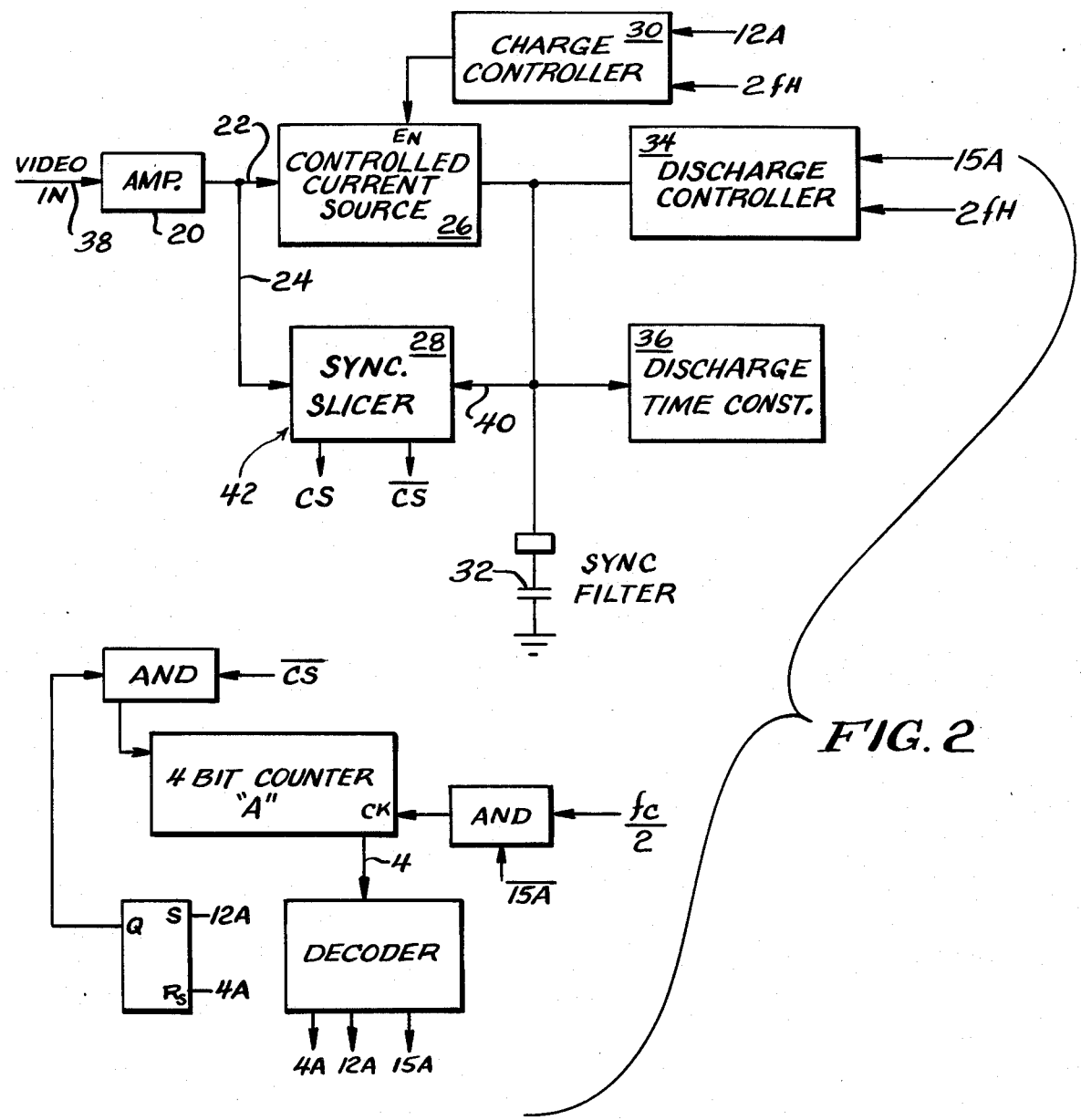
FIG. 2 illustrates a block diagram showing the general configuration of circuit components for effectuating sync separation in the preferred embodiment and also illustrates the necessary logic for the timing operations.

Specifically, referring now to FIG. 2, therein is shown a block diagram of the composite sync separator of the preferred embodiment of the present invention. This diagram illustrates that the video signal is received at an amplifier stage 20 and split into two paths 22 and 24, path 22 going to a controlled current source 26 and path 24 providing video information to a sync slicing comparator 28. Controlled current source 26 is controlled by a charge controller 30 to provide current for charging a filter capacitor 32. (The very small block above the sync filter capacitor 32 denotes that capacitor 32 is an external component.) Filter capacitor 32 provides a D.C. reference level voltage to the sync slicing comparator 28. Filter capacitor 32 is effectively controlled as to its rate of charging and length of charging by current source 26, a discharge controller 34, and a discharge time constant circuit 36.

In the prefered embodiment of the present invention, amplifier 20 inverts and amplifies the input video signal received on a line 38 to present a positive video signal to the current source 26 and sync slicing comparator 28. Current source 26 then provides a constant current to charge filter capacitor 32 in response to pulses, noramlly only the sync pulses, in the signal from amplifier 20. Charging current from current source 26 is cut off by charge controller 30 in response to decode signals received from timing logic circuitry (this aspect is discussed below). Also, charge controller 30 resets current source 26 twice per horizontal interval by the action of the flip-flop 2fH input (7AT.CLK) which is a pulse train signal having pulses occurring twice per horizontal field. Filter capacitor 32 is charged by the current from current source 26. Thus, at any given instant, the voltage across filter capacitor 32 provides a D.C. reference voltage to sync slicing comparator 28 at input 40 for comparison therein to the positive video signal received at another input 42 from amplifier 20. Due to the regulated charging of filter capacitor 32, the D.C. reference voltage supplied to sync slicing comparator 28 is generally above the porch level of the composite signal. Thus, sync slicing comparator 28 provides an output, CS, which represents only composite sync information effectively separated from the remainder of the video signal information. This circuit also outputs negative composite sync as shown by output $\overline{CS}$.

In the description of the preferred embodiment a number of signals are referenced. These signals, such as 7AT.CLK and A2T.$\overline{A3T}$, are typically available within the television receiver. Specifically, 7AT.CLK is a timing derived signal having a frequency of 2fH, that is, twice the horizontal scan frequency. Similarly, A2T-.$\overline{A3T}$ is a timing derived signal having the same 2fH frequency and related to the 7AT.CLK signal as may be seen by comparing waveforms B and D of FIGS. 4, 5, and 6. These signals may be generated by one circuit, or may be separatedly generated, or may even be generated within the sync separator and differentiator. It will be appreciatied that the origin of these signals is not crucial to the operation of the present invention as long as they approximate the frequency and timing correspondence discussed herein.

In this circuit, nonstandard and vertical interval signals are accounted for by charge controller 30, by discharge controller 34, and by discharge time constant circuit 36. Effectively, these circuits control the charging and discharging of filter capacitor 32 to regulate the D.C. reference voltage at input 40 of sync slicing comparator 28. Specifically, charge controller 30 relies upon the timing circuit which is shown as a block diagram in the lower left hand corner of FIG. 2 (discussed below in detail in conjunction with FIG. 3) to Dut off the charging current after approximately 6.72 microseconds during each half of a horizontal sweep period. The action of charge controller 30 effectively controls the width of the pulses which charge filter capacitor 32.

Similarly, discharge controller 34 is responsive to the detection of a pulse of at least 8.4 microseconds in duration logically combined with other signals, A2T.$\overline{\text{A3T}}$ and 7AT.CLK, (explained in detail below) and is effective to keep filter capacitor 32 from charging significantly longer for vertical sync pulses (typically 26 to 28 microseconds in duration) than for horizontal sync pulses (typically about 5 micro seconds long) and equalizing pulses (typically 2 to 2.5 microseconds long). The A2T.A3T and $\overline{\text{7AT.CLK}}$ signals allow the capacitor to charge for intervals of about eight microseconds during each one-half line period of a continuous multi-line vertical sync signal. This, in effect, presents a more constant D.C. reference level to sync slicing comparator 28 rather than allowing the voltage on filter capacitor 32 to build up during the longer vertical sync pulses which would cause sync slicing comparator 28 to be more sensitive during the vertical sync period. This keeps the circuit functioning accurately regardless of the length of the sync pulse present. In other words, discharge controller 34 makes the sync separator independent of the duration of sync pulses actually applied to the television receiver.

Discharge time constant circuit 36 acts as a large, variable resistor in the charging circuit for filter capacitor 32. Because its net resistance varies inversely with the amount of current present to charge filter capacitor 32, discharge time constant circuit 36 is effective to slow the discharge of filter capacitor 32 for weak signal conditions. This effectively moves the D.C. level reference voltage for sync slicing comparator 28 toward the sync tip level to increase the sensitivity of the overall circuit operation, during noisy, weak signals.

The preferred embodiment of the present invention also provides for the differentiation of pulses longer than the typical horizontal sync pulse to provide consistent current pulses to the horizontal A.P.C. circuitry typically found in television receivers. This aspect of the present invention will be discussed more thoroughly below in conjunction with the circuit schematic of FIG. 3.

Figure 3:
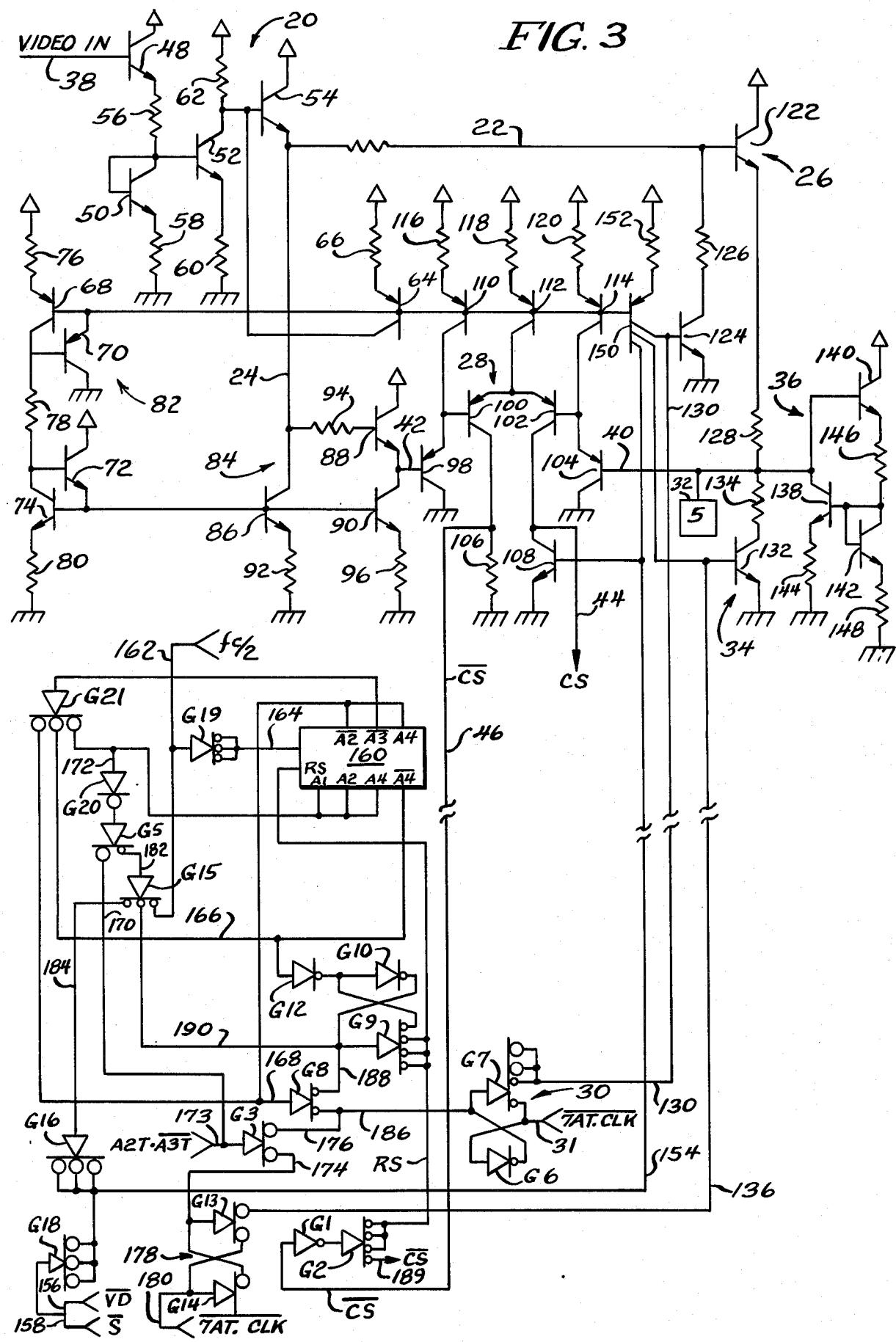
FIG. 3 is a schematic diagram of the sync separator and differentiator circuit of the preferred embodiment also showing the timing logic circuit used in the preferred embodiment.

Referring now to FIG. 3, therein is shown a detailed schematic diagram of the prefered embodiment of the digital sync separator and differentiator of the invention. (In FIG. 3, small, open triangles represent a connection to a positive potential, typically eight volts). Generally, video signal information is received on a line 38 at the input to amplifier 20. Amplifier 20 shifts and amplifies the signal before it is split and sent to controlled current source 26 via line 22 and sync slicing comparator 28 via line 24. Charge controller 30 regulates the current output of current source 26 to capacitor 32. Discharge controller 34 and discharge time constant 36 regulate the rate at which capacitor 32 discharges. The voltage across capacitor 32 is displayed at one input 40 to sync slicing comparator 28 which receives the composite video signal at its other input 42. The circuit illustrated has outputs CS, composite sync (on a line 44) and $\overline{\text{CS}}$, negative composite sync (on a line 46).

Typically, the signal received on line 38 is negative composite video having a base carrier level at about 7 volts, front and back porch level at about 4.75 volts, and sync tip level at about 4.0 volts. Amplifier 20 inverts the signal and provides a gain for circuit operation, usually of about two. The output of amplifier 20 is then split to provide positive video signal information to current source 26 and sync slicing comparator 28 on lines 22 and 24, respectively.

More particularly, amplifier 20 comprises transistors 48, 50, 52, and 54 with resistors 56, 58, 60 and 62 in a traditional configuration to accomplish the desired signal shifting and amplification. Also, a transistor 64 and a resistor 66 provide a constant current source as an offset to keep the sync tips at an acceptable operating point without sacrificing gain.

Transistors 68, 70, 72, and 74 in the configuration shown with resistors 76, 78, and 80 comprise a PNP-NPN current source reference 82 which regulates the current flowing in line 24 to sync slicing comparator input 42. More particularly, current source reference 82 regulates the current flowing in buffer circuit 84 comprising transistors 86, 88, and 90 and resistors 92, 94, and 96 and having its output on line 42 as one input to sync slicing comparator 28.

Sync slicing comparator 28 receives positive video from amplifiere 20 on line 24 through emitter follower buffer 84 as one input on line 42. The other input to sync slicing comparator 28 is the reference voltage supplied by filter capacitor 32 via line 40. Sync slicing comparator 28 then operates as a standard comparator to compare the positive video information on line 42 to a D.C. reference voltage on line 40. A representative output is then generated on line 44, while the inverse output is generated on line 46. Effectively, sync slicing comparator 28 operates to slice off most of the video signal received on line 42 and outputs on line 44 only that portion of input video which is above the D.C. reference of line 40, essentially the composite sync signal, CS, as described above.

More particularly, sync slicing comparator 28 comprises a differential amplifier which includes transistors 98, 100, 102 and 104. The amplifier also includes an output resistor 106, an output transistor 108, current supplying transistors 110, 112 and 114 and corresponding resistors 116, 118 and 120. As is well known, the differential amplifier will supply an output on line 44 which corresponds to the difference in voltage between the signals applied to the inputs 42 and 40 of the amplifier. Thus, the reference voltage applied to input 40 is subtracted from the video signal applied to input 42. In other words, the D.C. reference voltage is subtracted from the video signal to produce the composite sync signal, CS, on line 44.

The D.C. reference voltage of filter capacitor 32 on line 40 is variably controlled by current source 26, discharge controller 34, and discharge time constant circuit 36. Specifically, current source 26 operates to limit the time during which filter capacitor 32 receives current. Viewed in the perspective of the sync pulse train signal, filter capacitor 32 charges only during the "on" time of each pulse; thus, the voltage of filter capacitor 32 is proportional to the duty cycle of each pulse. Current source 26 can effectively limit and control the voltage on filter capacitor 32 by controlling the time it charges and in fact does so by controlling the duty cycle of the pulse train on line 22. Through the toggling action of charge controller 30, current source 26 limits the "on," or charging, time for filter capacitor 32 to about 6.72 microseconds.

More particularly, this is seen in FIG. 3 as current source 26 including transistors 122 and 124 with resistors 126 and 128 and a flip-flop gate arrangement of G7 and G6 of charge controller 30. This flip flop arrangement receives a time limit decode, corresponding to approximately 6.72 microseconds as described more fully below, and a $\overline{7AT.CLK}$ signal (which pulses twice per horizontal line period) which causes it to toggle on receipt of the time limit decode. The toggling signal of the flip-flop of charge controller 30 on a line 130 drives transistor 124 on, thus effectively shunting current from transistor 122 and ending the charge cycle for filter capacitor 32. Charge controller 30 and the flip flop arrangement of G6 and G7 is reset by the $\overline{7AT.CLK}$ on a line 31 thus allowing charging of filter capacitor 32 by the next received sync pulse—but still limiting the charging due to any one pulse to about 6.72 microseconds per one-half line period.

The time limit of 6.72 microseconds for charging of capacitor 32 was chosen as a compromise to insure that normal horizontal sync pulses (duration approximately five microseconds) were allowed to charge capacitor 32 for their full duration while at the same time preventing longer pulses from driving up the voltage on capacitor 32 by charging it for too long a period.

Discharge controller 34 comprises a transistor 132 with a resistor 134 and operates to control the discharging of filter capacitor 32 at a time determined by the decode of the 15A (8.4 microsecond) signal in conjunction with two other signals ($\overline{7AT.CLK}$ and $\overline{A2T.A3T}$) on a line 136. This is accomplished by receipt of the decode signal on line 136 which drives transistor 132 "on" to change the discharge time constant for filter capacitor 32, effectively limiting the D.C. reference voltage displayed on line 40. Transistor 132 turns off and allows charging of filter capacitor 32 at its original time constant when a new sync pulse is received which is after $\overline{7AT.CLK}$ is decoded which causes line 136 to go low. This is described more fully below in conjunction with the description of the timing logic circuitry.

Similarly, discharge time constant circuit 36 operates to vary the discharge time for filter capacitor 32 by acting as a large resistor. This circuit causes the D.C. reference voltage to be maintained nearer to the sync tip voltage level during noisy and weak signal conditions. This effectively allows greater distinction or separation of sync information from the surrounding signals even though the signal itself has become less distinct due to its noisy or weak condition. Particularly, transistors 138, 140, and 142 with associated resistors 144, 146, and 148 operate as a current source mirror to vary the circuit resistance corresponding to the signal strength as measured by the current through resistor 128.

At this point it is appropriate to note that transistor 150 and its associated resistor 152 operate to pull up the digital signals received via lines 130, 136, and 154 to turn on transistors 124, 132, and 108, respectively In a sense, transistor 150 serves to interface the digital portion of the circuit with the analog.

Thus, sync separation by sync slicing comparator 28 is controlled by three modalities as represented by the circuits of current source 26, discharge controller 34, and discharge time constant 36. As described, this allows a greater distinction and separation of the sync information from the surrounding video signal even during noisy and weak signal conditions.

However, the prefered embodiment of the present invention also provides for attempted standardization of the signal received by the horizontal A.P.C. circuit via output line 44 during the vertical periods of both standard and nonstandard signals. To do this, the circuit of the invention cuts off the positive composite sync pulse on line 44 at a preset point after its initiation. This maintains a uniform current pulse width to keep the circuits properly in phase during wide vertical sync pulse periods.

Referring to FIG. 3, this aspect of the present invention is accomplished by a transistor 108 which is driven "on" by the 15A decode signal (corresponding to 8.4 microseconds as described more fully below) received on a line 154 from the timing logic circuitry. This effectively shuts off the composite sync signal on line 44 which is supplied to a Horizontal A.P.C. circuit (not shown). Once a new sync pulse is received, 15A decode on line 154 drops low and composite sync is allowed to pass on line 44 again. However, because of the enabling action of the VD signal on a line 156 (which is low only when a vertical drive signal is present) and the $\overline{S}$ signal on a line 158 (which is low only when a standard signal is present) and the action of gates G18 and G16, truncation of the pulses on line 44 via transistor 108 may only occur during a vertical interview defined by a vertical drive signal and during a nonstandard signal. This introduces a $\overline{S}.\overline{VD}$ window on the operation of this aspect of the present invention. Thus, the "on" time for any sync pulse outputted on line 44 during this interval is limited to 8.4 microseconds. In practice, this is of particular significance during the serrated vertical time period of the composite sync signal in which the "on" time of the sychronizing pulses is in the neighborhood of 26 to 28 microseconds compared to the horizontal and equalizing pulse periods during which the "on" time of the synchronizing pulses ranges from 2.5 to 5.1 microseconds.

Vertical drive may be initiated in many ways. One method which is particularly compatible with the present invention generates integrated vertical in response to vertical sync is disclosed in U.S. Application Ser. No. 540,740, by Warrick, filed Oct. 11, 1983 and assigned to Zenith, the assignee of the present application, the teachings of which are incorporated herein by reference. Similarly, standard and nonstandard signals may be recognized by a number of methods one of which is disclosed and discussed in U.S. Pat. No. 4,298,890, by Srivastava and Lai, issued Nov. 3, 1981, also assigned to Zenith.

This pulse truncating property is also significant, however, during nonstandard operation, for instance, when television video games or computers are connected to the sync separator, because these systems do not use a standardized sync signal and their synchronizing pulses may be longer than those normally encountered in standard video operation. However, nonstandard horizontal pulses are not truncated, even though they may sometimes be of nonstandard length because of the need to preserve carefully the horizontal sync process.

Also, difficulties may arise if the vertical period, having long sync pulses which are desired to be truncated, endures longer than about seven horizontal lines which is the typical duration of a vertical drive signal. If this occurs, the pulses will not be truncated in a nonstandard signal.

The lower left portion of FIG. 3 is a detailed schematic diagram of the timing logic circuitry referred to above. This circuitry is interfaced with the analog circuitry of FIG. 3 through a transistor 150 and a resistor 152 as explained above. Operationally, the circuitry is connected by lines 46, 130, 136, and 154 to provide the timing decode signals referred to above and a reset signal as described below. Also, the flip-flop toggling action of gates G7 and G6 has been described above.

A four bit counter 160 receives a high frequency clock source, Fc/2 (½ color sub-carrier frequency) on a line 162 at a toggle input 164 which is controlled by an AND gate G19. Gate G19 serves to latch counter 160 when 8.4 microseconds have elapsed from the beginning of any synchronizing pulse. This is done through the receipt of the logical inverse of the 15A (8.4 microsecond) decode signal by gates G20, G5, and G15 interconnected as shown with the representative outputs of counter 160. In this fashion, counter 160 counts and displays a representative, accumulated count of high frequency clock pulses for a period of 8.4 microseconds and then is latched to that count until reset.

Specifically, counter 160 has representative outputs which are logically interconnected to provide the decode signals 4A, 12A, and 15A corresponding to approximately 2.3 microseconds, 6.7 microseconds, and 8.4 microseconds on lines 166, 168, and 170, respectively. These signals are used in conjunctin with the A2T.$\overline{A3T}$ and 7AT.CLK as described to effectuate various circuit operations throughout the analog and digital circuitry of FIG. 3. In addition, the signals are used in the preferred embodiment to control the resetting of counter 160 and interface the digital circuitry with the vertical sync circuitry described in Warrick, U.S. Application Ser. No. 540,740, filed Oct. 11, 1983. Finally, this circuitry allows some provision to be made for nonstandard circuit operation, such as video games and tapes.

More particularly, outputs A1, A2, and A4 of counter 160 are interconnected with the $\overline{A3}$ signal of a gate G21 as shown to produce the 15A decode signal on a line 172 which is then buffered through gates G20 and G5 to provide the 15A decode signal on line 170 to be ANDed with a A2T.$\overline{A3T}$ signal on a line 173 at a gate G3 to produce outputs on lines 174 and 176. The output on line 174 sets a flip-flop 178 comprising gates G13 and G14 to produce an output on line 136 to discharge controller 34 for operation as explained above. Flip-flop 178 is reset by the $\overline{7AT.CLK}$ signal received on line 180.

A corresponding 15A signal is produced on a line 182 and inverted by a gate G15 to provide a clocking latch signal to gate G19 which inhibits the toggle input to counter 160 and keeps it from advancing during the period after 8.4 microseconds and before the next sync pulse. Also, the output of G15 is presented on a line 184 to a gate G16 to implement the conditions for differentiating sync pulses as more fully described above.

Similarly, the $\overline{A2}$ and A4 outputs of counter 160 are interconnected as shown with the output gate G21 to produce a 12A decode on a line 168. This signal is then buffered by a gate G8 to produce a time limit decode on a line 186 to charge controller 30 comprising the flip-flop configuration of G7 and G6. This time limit decode is a combination of the $\overline{12A}$, 15A and A2T.$\overline{A3T}$ signals and represents $\overline{12A}$ ORed with the signal created by ANDing 15A with A2T.$\overline{A3T}$ and controls the width of the sync pulses that charge filter capacitor 32 as explained above. Line 190 is also tied to line 186 which keeps the flip-flop of gates G10 and G9 from latching during start-up and other circuit transistions. Also, the output of G8 is combined with the $\overline{15A}$ output of G15 to provide an input on a line 188 to a flip-flop arrangement of gates G10 and G9 to effectuate the reset timing as explained more fully below. Counter 160 also provides a 4A decode signal on line 166 through the interconnection of the $\overline{A4}$ output and the gate G21 output. This provides the other input to the flip-flop configuration of gates G10 and G9 to effectuate the reset timing.

The logic circuitry also receives the inverted composite signal, $\overline{CS}$, on line 46. This is buffered by gates G1 and G2 and sent as $\overline{CS}$ on a line 189 to vertical sync circuitry (not shown). This signal is also used to reset counter 160 as controlled by the flip-flop action of gates G10 and G9.

The operation of the gate G10 and G9 flip-flop is such that counter 160 is reset by the trailing (rising) edge of the $\overline{CS}$ signal pulse unless the duration of the sync pulse falls between about 2.3 microseconds and about 6.7 microsecond, conditions which are imposed by the signals on lines 188 and 166. When the sync pulse is in that range, the present invention seeks to manipulate it as described more fully above to insure consistent charging of filter capacitor 32. Specifically, a pulse in this range is likely to be a horizontal sync pulse (NTSC standard duration of approximately 5 microseconds) or an equalizing pulse (NTSC standard duration of approximately 2.5 microseconds). As explained above, an object of the present invention is to separate such normal signals based on their characteristics while effectively discounting such factors as noise and signal strength as much as possible. Thus, the system seeks to charge filter capacitor 32 for approximately the same time for pulses representing the same information regardless of minor variations due to other conditions. To accomplish this, it is desired that the counter emit a 6.7 microsecond control signal for each received pulse in the desired range even if it does not last that long itself. For that reason, the G10 and G9 flip-flop configuration inhibits the reset to counter 160 for a period between 2.3 microseconds seconds and 6.7 microseconds after the pulse is initiated; thus, counter 160 may accumulate a 6.7 microsecond representative count for display on line 130 to controlled current source 26. Also, as a precaution during circuit startup, the 15A signal on a line 190 is used to reset the G10/G9 flipflop.

The logic circuitry of FIG. 3 also seeks to make provision for accomodating nonstandard sync pulses while effectively differentiating vertical serrated pulses. Specifically, this is done through the action of gates G18 and G16 and interconnections as shown which combine the 15A decode signal with information regarding the vertical drive signal received on a line 156 and the standard/nonstandard operation information received on a line 158. For example, whenever $\overline{S}$ is low (standard signal), the horizontal A.P.C. output on line 44 is confined to pulses which are truncated to 8.4 microseconds in duration through the action of the 15A decode signal on line 154 and transistor 108 as described above. However, the 15A decode, differentiation, signal is inhibited during nonstandard operation accept for vertical drive periods, thus avoiding clock jitter during displayed video, if horizontal sync is wider than 8.4 microseconds.

The operation of the logic circuitry of FIG. 3 may be better understood when viewed in conjunction with the waveforms of FIGS. 4, 5, and 6 which illustrate the signals present at various points in the logic circuit in response to various signals having different sync characteristics. Specifically, FIG. 4 represents the circuit response to a signal having standard sync. FIG. 5 is the circuit response to a signal having nonstandard sync. And, FIG. 6 is a response to a signal of the type used on Bellguard video tapes mentioned above.

The waveforms of each figure, labelled A through E, represent the signal at the same respective points in the circuit in each figure. Specifically, Waveform A in each figure represents the negative composite sync, $\overline{CS}$, on line 46. Waveform B represents the $\overline{7AT.CLK}$ signal on lines 31 and 180. Waveform C is the output from the G7-G6 flip-flop on line 130 which controls current source 26 by turning transistor 124 on and off. Waveform D represents the $A2T.\overline{A3T}$ signal on line 173. And, Waveform E represents the signal on line 136 which controls discharge controller 34.

It will be appreciated that the present invention is designed to be used with other circuits in the operation of a television set or otherwise. Such interconnections as would be necessary or have otherwise been referred to herein would be apparent to one skilled in the art and familiar with the teachings of this application, and hence have not been discussed or shown in detail in the drawings. Similarly, the illustrated logic circuitry uses integrated injection logic, but it could clearly be implemented using other logic schemes.

Although the present invention has been described in terms of the illustrative preferred embodiment, the exact scope of the invention is set out in appended claims. It will be thusly appreciated that changes may be made in the implementing circuitry without escaping the scope and spririt of the invention described herein.

What is claimed is:

1. In a television receiver system for receiving a composite video signal bearing video and sync information in pulse form, a method for separating sync information from said video information comprising:
generating a D.C. reference voltage across a capacitor by supplying a charging current derived from said composite video signal to said capacitor;
subtracting said D.C. reference voltage from said composite video signal to provide separated sync information;
generating an output signal representative of said separated sync information, said output signal having pulses corresponding to the sync pulses in said received video signal;
determining the length of time elapsed since the first occurrence of a sync pulse in said output signal; and
limiting the time during which said charging current is supplied to said capacitor to a predetermined length of time after the first occurrence of a sync pulse in said output signal so as to control the magnitude of said D.C. reference voltage.

2. The method of claim 1 further including controlling said D.C. reference voltage by discharging said voltage across said capacitor.

3. The method of claim 2 wherein the discharging of said capacitor is provided by a discharge circuit having a discharge time constant which is controlled in response to variations in the strength of said received signal.

4. The method of claim 3 wherein the discharging of said capacitor is provided by a discharge circuit having a first discharge time constant when a sync pulse first occurs in said output signal and a second discharge time constant a predetermined amount of time after the first occurrence of a sync pulse in said output signal.

5. The method of claim 1 further including:
generating a vertical drive signal in response to vertical sync pulses in said sync output signal;
monitoring the sync pulses in said received composite signal;
determining when the sync pulses are likely to be of a duration longer than typical horizontal sync pulses; and
terminating the output pulse corresponding to each sync pulse in said received signal having a duration longer than a predetermined period in response to said determining.

6. The method of claim 5 further including:
detecting the absence of said vertical drive signal;
detecing when said received signal is a nonstandard signal; and
performing said determining step only when a vertical drive signal is absent during non-standard signal reception.

7. In a television receiver system for receiving a composite video signal bearing video and sync information in pulse form, a method for separating sync information from said video information comprising:
generating a D.C. reference voltage across a capacitor by supplying a charging current derived from said composite video signal to said capacitor;
subtracting said D.C. reference voltage from said composite video signal to provide separated sync information;
generating an output signal representative of said separated sync information, said output signal having pulses corresponding to the sync pulses in said received video signal; and
discharging said capacitor with a discharge circuit having a discharge time constant which is controlled in response to variations in the strength of said received video signal.

8. In a television receiver system for receiving a composite video signal bearing video and sync information in pulse form, a method for separating sync information from said video information comprising:
generating a D.C. reference voltage across a capacitor by supplying a charging current derived from said composite video signal to said capacitor;
subtracting said D.C. reference voltage from said composite video signal to provide separated sync information;
generating an output signal representative of said separated sync information, said output signal having pulses corresponding to the sync pulses in said received video signal;
determining the length of time elapsed since the first occurrence of a sync pulse in said output signal; and
discharging said capacitor with a discharge circuit having a first discharge time constant when a pulse first occurs in said output signal and having a second discharge time constant a predetermined amount of time after the first occurrence of a sync pulse in said output signal.

9. In a television receiving system for receiving composite video signals bearing video and sync information, said sync information comprising pulses of potentially variable durations, said system having means for providing an indication whether a standard or a non-standard sync signal is being received and for generating a vertical drive signal in response to vertical sync pulses contained in said sync information portion of said received signal, a method of separating said sync information from said video information comprising:

maintaining a referene responsive to said received video signal;

subtracting said reference from said composite video signal to provide separated sync information;

generating an output signal representative of said separated sync information, said output signal having sync pulses corresponding to the sync pulses in said received signal; and controlling the duration of said sync pulses occurring in said output signal.

10. The method of claim 9 wherein said reference is a D.C. voltage generated across a capacitor by supplying a charging current derived from said composite video signal to said capacitor and wherein the method includes:

determining the length of time elapsed since the first occurrence of a sync pulse in said output signal; and limiting the time during which said charging current is supplied to said capacitor to a predetermined length of time after the first occurrence of a sync pulse in said output signal so as to control the magnitude of said D.C. reference voltage.

11. The method of claim 10 further including controlling said D.C. reference voltage by discharging said voltage across said capacitor.

12. The method of claim 11 wherein the discharging of said capacitor is provided by a discharge circuit having a discharge time constant which is controlled in response to variations in the strength of said received signal.

13. The method of claim 11 wherein the discharging of said capacitor is provided by a discharge circuit having a first discharge time constant when a sync pulse first occurs in said output signal and a second discharge time constant a predetermined amount of time after the first occurrence of a sync pulse in said output signal.

14. In a television receiver system for receiving a composite video signal bearing video and sync information in pulse form, apparatus for separating sync information from said video information comprising:

means for generating a D.C. reference voltage across a capacitor by supplying a charging current derived from said composite video signal to said capacitor;

means for subtracting said D.C. reference voltage from said composite video signal to provide separated sync information;

means for generating an output signal representative of said separated sync information, said ouptut signal having pulses corresponding to the sync pulses in said received video signal;

counting means for determining the length of time elapsed since the first occurrence of a sync pulse in said output signal; and control means for limiting the time during which said charging current is supplied to said capacitor to a predetermined length of time after the first occurrence of a sync pulse in said output signal so as to control the magnitude of said D.C. reference voltage.

15. The apparatus of claim 14 further including discharge means for discharging said voltage across said capacitor.

16. The apparatus of claim 15 wherein said discharge means comprises a discharge circuit having a discharge time constant which is controlled in response to variations in the strength of said received signal.

17. The apparatus of claim 16 wherein said discharge means comprises a discharge circuit having a first discharge time constant when a sync pulse first occurs in said output signal and a second discharge time constant a predetermined amount of time after the first occurrence of a sync pulse in said output signal.

18. The apparatus of claim 14 further including:

means for generating a vertical drive signal in response to vertical sync pulses in said sync output signal;

means for monitoring the sync pulses in said received composite signal;

determining means for determining when the sync pulses are likely to be of a duration longer than typical horizontal sync pulses; and means responsive to said determining means for terminating the output pulse corresponding to each sync pulse in said composite received signal having a duration longer than a predetermined period.

19. The method of claim 18 further including:

means for detecting the absence of said vertical drive signal;

means for detecting when said received signal is a non-standard signal; and means for enabling said determining means only when a vertical drive signal is absent during non-standard signal reception.

20. In a television receiver system for receiving a composite video signal bearing video and sync information in pulse form, apparatus for separating sync information from said video information comprising:

means for generating a D.C. reference voltage across a capacitor by supplying a charging current derived from said composite video signal to said capacitor;

means for subtracting said D.C. reference voltage from said composite video signal to provide separated sync information;

means for generating an output signal representative of said separated sync information, said output signal having pulses corresponding to the sync pulses in said received video signal; and discharge means for discharging said capacitor with a time constant which is controlled in response to variations in the strength of said received video signal.

21. In a television receiver system for receiving a composite video signal bearing video and sync information in pulse form, apparatus for separating sync information from said video information comprising:

means for generating a D.C. reference voltage across a capacitor by supplying a charging current derived from said composite video signal to said capacitor;

means for subtracting said D.C. reference voltage from said composite video signal to provide separated sync information;

means for generating an output signal representative of said separated sync information, said output signal having pulses corresponding to the sync pulses in said received video signal;

counting means for determining the length of time elapsed since the first occurrence of a sync pulse in said output signal; and discharge means for discharging said capacitor with a first discharge time constant when a pulse first occurs in said output signal and with a second discharge time constant a predetermined amount of time after the first occurrence of a sync pulse in said output signal.

22. In a television receiving system for receiving composite video signals bearing video and sync information, said sync information typically comprising pulses of potentially varying durations, said system having means for providing an indication whether a standard or a non-standard sync signal is being received and for generating a vertical drive signal in response to vertical sync pulses contained in said sync information portion of said received signal, apparatus for separating said sync information from said video information comprising:

means for maintaining a reference responsive to said received video signal;

means for subtracting said reference from said composite video signal to provide separated sync information;

means for generating an output signal representative of said separated sync information, said output signal having sync pulses corresponding to the sync pulses in said received signal; and controlling means for controlling the duration of said sync pulses occurring in said output signal.

23. The method of claim 22 wherein said reference maintaining means comprise means for generating a D.C. voltage across a capacitor by supplying a charging current derived from said composite video signal to said capacitor and wherein the apparatus includes:

means for determining the length of time elapsed since the first occurrence of a sync pulse in said output signal; and means for limiting the time during which said charging current is supplied to said capacitor to a predetermined length of time after the first occurrence of a sync pulse in said output signal so as to control the magnitude of said D.C. reference voltage.

24. The apparatus of claim 23 further including means for discharging said voltage across said capacitor.

25. The apparatus of claim 24 wherein the discharge means comprises a discharge circuit having a discharge time constant which is controlled in response to variations in the strength of said received signal.

26. The apparatus of claim 24 wherein the discharge means comprises a discharge circuit having a first discharge time constant when a sync pulse first occurs in said output signal and a second discharge time constant a predetermined amount of time after the first occurrence of a sync pulse in said output signal.

27. The method of claim 9 wherein said controlling comprises:

monitoring the duration of said sync pulses in said received signal; and terminating said sync pulses in said output signal after some predetermined duration.

28. The method of claim 27 further including:

detecting the presence of said vertical drive signal; and disabling said terminating step when said vertical drive signal is detected.

29. The method of claim 28 further including:

detecting the presence of a nonstandard received signal; and discontinuing said disabling step in response to said detection.

30. The apparatus of claim 22 wherein said controlling means comprises:

means for monitoring the duration of said sync pulses in said received signal; and terminating means for terminating said sync pulses in said output signal after some predetermined duration.

31. The apparatus of claim 30 further including:

detecting means for detecting the presence of said vertical drive signal; and disabling means for disabling said terminating means when said vertical drives signal is detected.

32. The apparatus of claim 31 further including:

second detecting means for detecting the presence of a nonstandard received signal; and second disabling means for disabling said first disabling means in response to said detection.

* * * * *